June 4, 1929.  S. RUBEN  1,715,789
ELECTRICAL CONDENSER
Filed Oct. 10, 1924
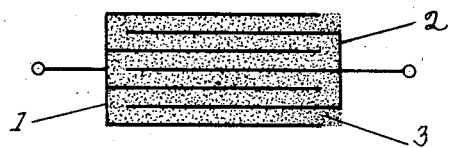
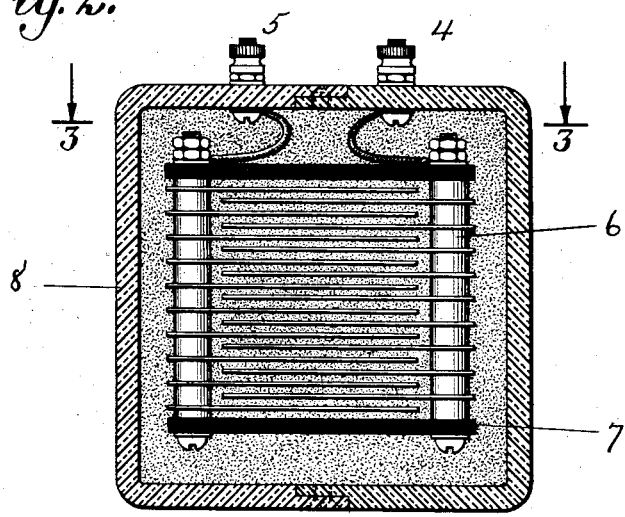
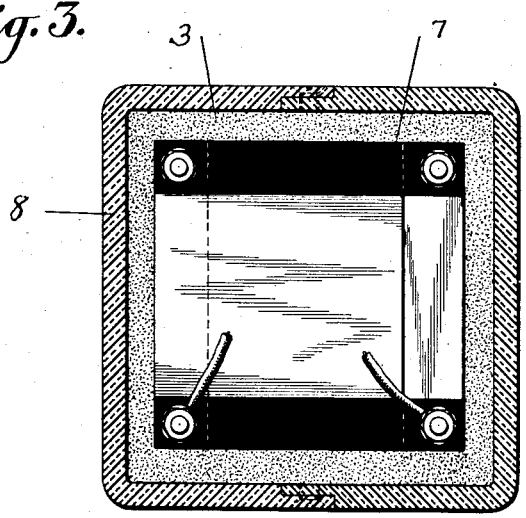
Inventor
Samuel Ruben
By his Attorney M.W.Clephane Patented June 4, 1929.

1,715,789

UNITED STATES PATENT OFFICE.

SAMUEL RUBEN, OF NEW YORK, N. Y.

ELECTRICAL CONDENSER.

Application filed October 10, 1924. Serial No. 742,787.

This invention relates to an electrical condenser, and more particularly, it relates to an electrical condenser of the high capacity type.

In various fields, such, for example, as for low voltage filter circuits, in which it is desirable to produce a constant direct current supply from a rectified alternating current input, large electrical capacity is required. In the prior art the condensers applied to this purpose are those having electrodes of wide surface areas, such as sheets of tin foil, etc., and employing as a dielectric material, thin wax paper separating the electrode surfaces. In another form a liquid electrolyte has been used to form a film upon the electrode surfaces by electro-chemical reaction as a potential is applied to its electrodes. The chief object of this invention is to provide a permanent low cost condenser of high electrostatic capacity and relatively small surface area.

In the practice of the present invention the inverse current-blocking film, which is formed electrochemically between the electropositive and electronegative elements of an asymmetric electric couple, is utilized as the dielectric between the elements of condenser when constructed as herein provided. The utilization of an asymmetric couple comprising an electropositive electrode element of an electropositive metal, such as aluminum, in contact with an electronegative element contain a highly electronegative chemical element, such as sulphur, serves as convenient means for providing such a dielectric film. Accordingly if an aluminum electrode element be coated with a sulphur-containing compound, such as aluminum sulphide, a film may be formed by electrochemical reaction at the contacting surface between the aluminum and its coating, for example, when the aluminum electrode has a positive polarity, substantially no current passes in the circuit, but when it has a negative polarity, the resistance offered is negligible. The film, when formed, imparts relatively high electrostatic capacity to this combination because of the extreme thinness of the current-blocking film. Such comparison in electrostatic capacity is, of course, for a given surface area.

In order that this condenser may be connected in a circuit independently of the polarity of its connection, both of its electrode elements are composed of an electropositive material, such as aluminum, with the intervening space filled with cupric sulphide, in contact with the films or coatings, used to effect the repair or restoration thereof in the event that the sulphide film surface is injured by operation under excess potential. The cupric sulphide may be in the form of a powdered substance in contact with the electrode surfaces, or it may be applied in solution with a drying binder upon the electrode film surfaces, or in any other suitable manner so as to be in contact with the electrode surfaces.

The sulphide film is produced by reaction between the aluminum electrode plates and an alkaline sulphur compound, preferably sodium sulphide, the reaction being best obtained for creating a uniform surface by immersion of the electrodes in a sulphide solution heated to 100 deg. C. The cupric sulphide is obtained by heating copper in an atmosphere of sulphur vapors free from oxygen above 150 deg. C., at which temperature the formation of cuprous sulphide is prevented.

In order to afford a full understanding of the principles of the invention, one embodiment thereof in a specially desirable practicable form is illustrated in the accompanying drawings, and is hereinafter described in detail for the sake of a concrete illustrative example; but it is to be understood that the invention is not limited to this particular arrangement.

In the drawings referred to,

Fig. 1 represents a horizontal sectional view of the condenser and Fig. 2 gives a vertical sectional view of the apparatus, Fig. 3, showing a plan view thereof.

Referring more particularly to the drawings, 1 and 2 represent aluminum electrodes, provided with a coating of aluminum sulphide, and 3 a cupric sulphide powder packed between the electrodes. The electrodes are supported upon electrical conducting posts 6, which are maintained in position by bakelite plates 7. The electrode terminals are respectively at 5 and 4. The device is within insulating container 8. The function of the cupric sulphide is to provide the sulphur for repairing the dielectric sulphide film, should that element break down an account of overload, the sulphur reduced thereby, being replaced by that of the cupric sulphide, which gives up its sulphur as the excess potential recedes towards normal values. In this respect the film is self-healing.

What I claim is:—

1. An electrical condenser having metallic aluminum electrodes disposed in spaced relation, said electrodes being coated with aluminum sulphide, and the space between said electrodes containing a compound adapted to supply free sulphur ions under electric pressure, said compound being in close surface contact with said aluminum sulphide coating.

2. An electrical condenser having metallic aluminum electrodes, said electrodes being coated with aluminum sulphide, and the space between said electrodes containing cupric sulphide in close surface contact with said aluminum sulphide coating.

Signed at New York in the county of New York and State of New York this 3rd day of October, A. D. 1924.

SAMUEL RUBEN.